United States Patent
Lim

(10) Patent No.: US 9,955,139 B2
(45) Date of Patent: Apr. 24, 2018

(54) DISTANCE ADAPTIVE 3D CAMERA

(75) Inventor: Haekeun Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 822 days.

(21) Appl. No.: 13/518,736

(22) PCT Filed: Dec. 23, 2010

(86) PCT No.: PCT/KR2010/009301
§ 371 (c)(1),
(2), (4) Date: Jan. 2, 2013

(87) PCT Pub. No.: WO2011/078615
PCT Pub. Date: Jun. 30, 2011

(65) Prior Publication Data
US 2013/0107001 A1    May 2, 2013

(30) Foreign Application Priority Data

Dec. 23, 2009 (KR) .................. 10-2009-0130197

(51) Int. Cl.
*H04N 13/02* (2006.01)
*G03B 35/08* (2006.01)

(52) U.S. Cl.
CPC ......... *H04N 13/0203* (2013.01); *G03B 35/08* (2013.01); *H04N 13/0239* (2013.01); *H04N 13/0296* (2013.01)

(58) Field of Classification Search
None
See application file for complete search history.

(56) References Cited

U.S. PATENT DOCUMENTS

| 5,007,739 | A | * | 4/1991 | Shimano | G01B 11/043 250/559.26 |
| 2001/0030682 | A1 | * | 10/2001 | Tserkovnyuk et al. | 348/47 |
| 2004/0160512 | A1 | * | 8/2004 | Lee | H04N 5/232 348/42 |
| 2004/0167671 | A1 | * | 8/2004 | Aoyama | B25J 19/023 700/259 |
| 2008/0144924 | A1 | * | 6/2008 | Hoffmann | H04N 13/0246 382/154 |
| 2009/0097716 | A1 | * | 4/2009 | Wang | G06F 3/012 382/118 |

(Continued)

FOREIGN PATENT DOCUMENTS

| JP | 11-69380 A | 3/1999 |
| KR | 10-2007-0065500 A | 6/2007 |
| KR | 10-0874871 B1 | 12/2008 |

*Primary Examiner* — William C Vaughn, Jr.
*Assistant Examiner* — Jerry Jean Baptiste
(74) *Attorney, Agent, or Firm* — Birch, Stewart, Kolasch & Birch, LLP

(57) ABSTRACT

The present invention relates to a distance adaptive 3D camera capable of photographing a 3D image regardless of a distance to an object, the camera including a guide axis, a driving unit rotating a guide axis, a first camera module unit mounted at the guide axis to photograph a first image, and a second camera module unit mounted at the guide axis to photograph a second image, wherein the first and second camera module units are made to move on the guide axis to distance or near therebetween responsive to rotation directions of the guide axis.

14 Claims, 3 Drawing Sheets

(56) References Cited

U.S. PATENT DOCUMENTS

| | | | |
|---|---|---|---|
| 2009/0207236 A1* | 8/2009 | Feda | H04N 5/23212 348/47 |
| 2009/0270236 A1* | 10/2009 | Berc | 482/142 |
| 2012/0249751 A1* | 10/2012 | Zhang | G06T 7/002 348/47 |

* cited by examiner

[Fig. 1]
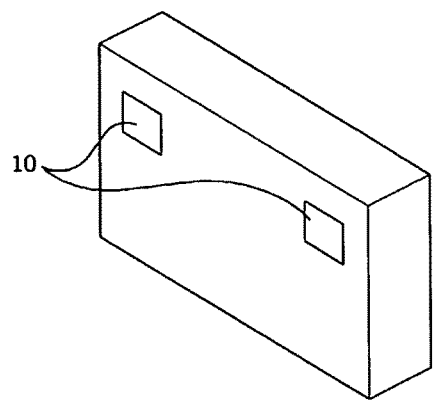
[Fig. 2]
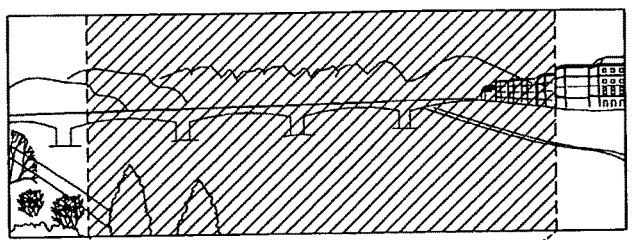
[Fig. 3]
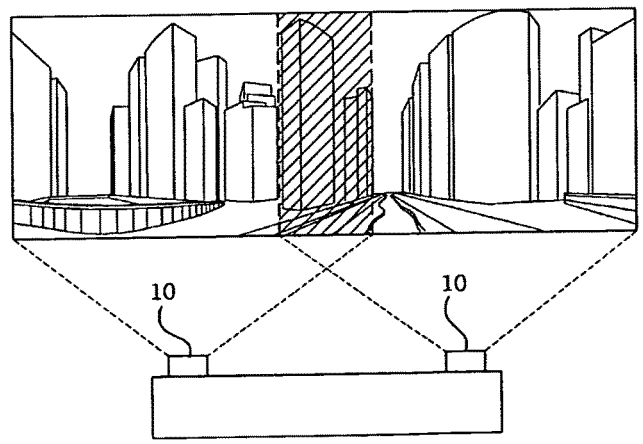

[Fig. 4]
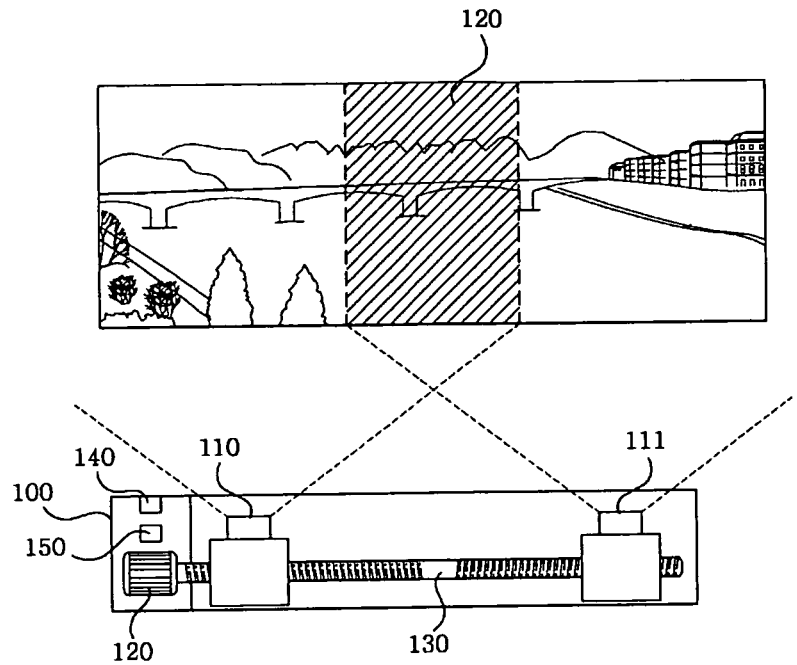
[Fig. 5]
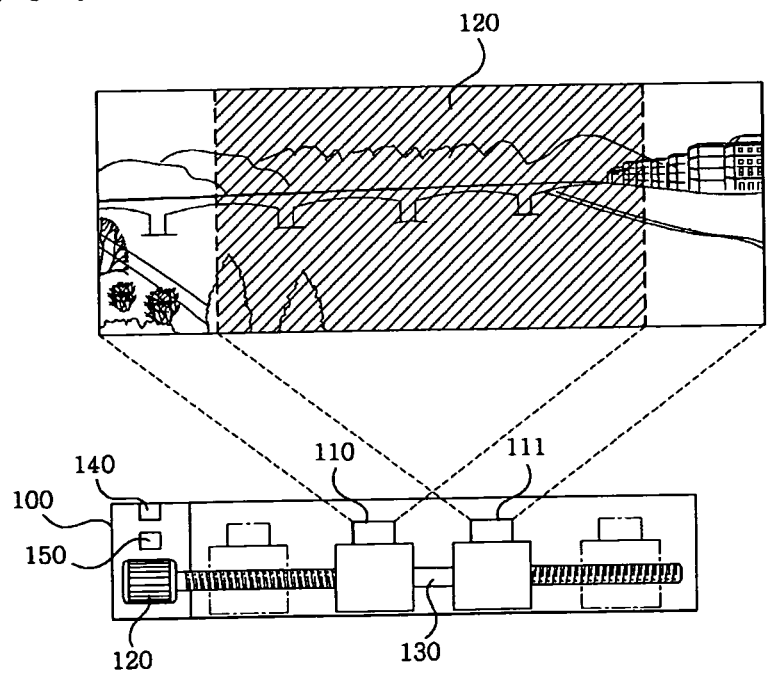

[Fig. 6]
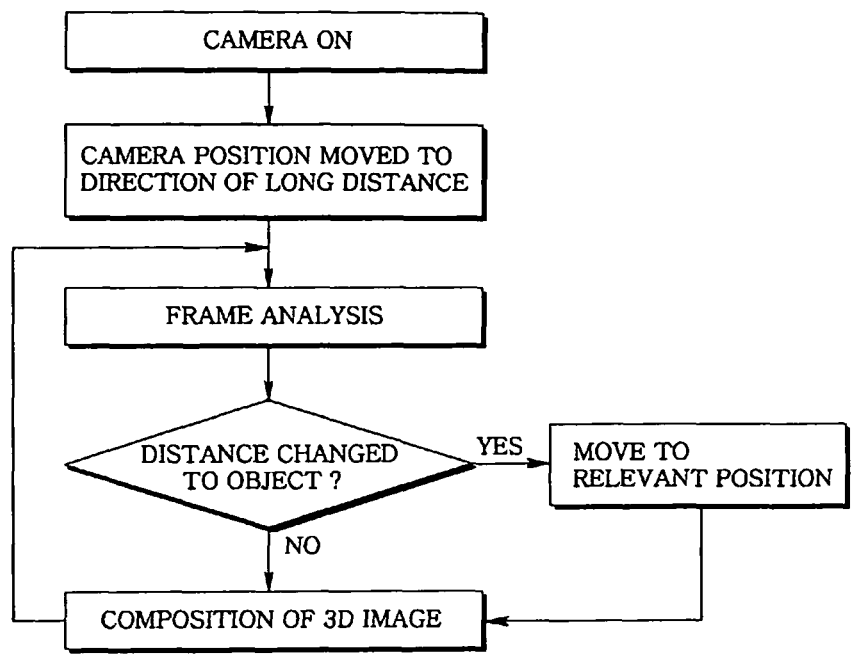

DISTANCE ADAPTIVE 3D CAMERA

TECHNICAL FIELD

The present invention relates to a distance adaptive 3D camera, and more particularly to a distance adaptive 3D camera enabling to realize a 3D image.

BACKGROUND ART

There exist various techniques and systems for producing 3D (three-dimensional) images. One type of approach uses a single lens 3D image photographing method and another type of approach uses a dual lens 3D image photographing method.

The single lens 3D image photographing method that employs one camera has no problem of synchronization between heads and between zoom lenses, but is problematic in that picture quality degenerates at a border between left and right 3D images due to bi-prism adapter, and picture quality degradation is generated by chromatic aberration that requires a fine method of compensation in designing.

Another problem in the single lens 3D image photographing method is that it is impossible to adjust convergence angles responsive to zoom and focus values, resulting in a limited photographing condition of photographing an image within a predetermined scope of convergence angle, whereby an obtained 3D image has half the resolution.

Meanwhile, the dual lens 3D image photographing method photographs left/right images by fixing two cameras in parallel across a predetermined space to an object, and is advantageous due to the fact that manufacturing cost is relatively inexpensive, it is easy to manipulate and there are fewer image distortions by keystone. That is, two image sensors like two eyes of a human are employed to photograph 3D images by simultaneously or sequentially obtaining 2D images comprising left/right images, such that the most common 3D camera so far used is the dual lens 3D camera.

FIG. 1 is a perspective view illustrating a conventional dual lens 3D camera, and FIGS. 2 and 3 are exemplary views illustrating a conventional dual lens 3D camera. In case of photographing an image from a long distance as illustrated in FIG. 2, most of the images are overlapped by a pair of camera modules (10) to realize a fine 3D image. However, in case of photographing an image from a short distance as illustrated in FIG. 3, images are partially overlapped by a pair of cameras (modules) to result in difficulty in realizing a fine 3D image.

DISCLOSURE OF INVENTION

Technical Problem

The present invention is disclosed to provide a distance adaptive 3D camera enabling to maximize a short distance photographing area in a dual lens 3D camera.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a distance adaptive 3D camera, the camera characterized by: a guide axis; a driving unit rotating a guide axis; a first camera module unit mounted at the guide axis to photograph a first image; and a second camera module unit mounted at the guide axis to photograph a second image, wherein the first and second camera module units are made to move on the guide axis to distance or near therebetween responsive to rotation directions of the guide axis.

In some exemplary embodiments of the present invention, the distance adaptive 3D camera may further include a distance measuring unit for measuring a distance between the first/second camera module units and an object.

In some exemplary embodiments of the present invention, the distance adaptive 3D camera may further include a controller for controlling movement of the first/second camera module units by controlling the driving unit based on a distance from the object measured from the distance measuring unit.

In some exemplary embodiments of the present invention, the distance adaptive 3D camera may further include a distance measuring unit having an AF algorithm for measuring a distance between the first/second camera module units and objects of the first/second images.

In some exemplary embodiments of the present invention, the distance adaptive 3D camera may further include a controller for controlling movement of the first/second camera module units by controlling the driving unit based on a distance from the object measured from the distance measuring unit.

In some exemplary embodiments of the present invention, the distance adaptive 3D camera may further include a controller for controlling movement of the first/second camera module units based on a ratio of an area in which the first/second images each photographed by the first/second camera module units are overlapped.

In another general aspect of the present invention, there is provided a distance adaptive 3D camera, characterized by: a first camera module unit for photographing a first image; a second camera module unit distanced from the first camera module unit at a predetermined space, for photographing a second image; and an adjusting unit for adjusting the distance between the first camera module unit and the second camera module unit.

In some exemplary embodiments of the present invention, the adjusting unit may adjust the distance between the first camera module unit and the second camera module unit to move the first camera module unit and the second camera module unit to a position suitable for photographing an image, if the distance between the first camera module unit and the second camera module unit is inadequate for photographing the image.

In some exemplary embodiments of the present invention, the adjusting unit may include a guide axis, and a driving unit for rotating the guide axis.

In some exemplary embodiments of the present invention, the distance adaptive 3D camera may further include a controller for controlling the driving unit by comparing a pre-stored distance value between the first/second module units based on a distance from an object, and an actual distance value between the first/second camera module units and the object.

Advantageous Effects of Invention

The distance adaptive 3D camera according to the present invention has an advantageous effect in that 3D image photographing scopes for long distance as well as short distance can be maximized by adjusting a distance between camera module units based on a distance from an object.

BRIEF DESCRIPTION OF DRAWINGS

FIG. 1 is a perspective view illustrating a conventional dual lens 3D camera.

FIGS. 2 and 3 are exemplary views illustrating a conventional dual lens 3D camera.

FIGS. 4 and 5 are projection plans illustrating a distance adaptive 3D camera according to an exemplary embodiment of the present invention.

FIG. 6 is a 3D image combination flowchart of a distance adaptive 3D camera according to an exemplary embodiment of the present invention.

BEST MODE FOR CARRYING OUT THE INVENTION

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the invention. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

For example, a second constituent element may be denoted as a first constituent element without departing from the scope and spirit of the present disclosure, and similarly, a first constituent element may be denoted as a second constituent element.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted.

Now, the present invention will be described in detail with reference to the accompanying drawings.

FIGS. 4 and 5 are projection plans illustrating a distance adaptive 3D camera according to an exemplary embodiment of the present invention.

A distance adaptive 3D camera according to the present invention may include a body (100), first/second camera module units (110, 111), a driving unit (120), a guide axis (130), a distance measuring unit (140) and a controller (150).

The first/second camera module units (110, 111) are formed on the guide axis (130) and move along the guide axis (130) rotating by the driving unit (120), where the first and second camera module units simultaneously move on the guide axis to distance or near therebetween, and the guide axis (130) may be realized by a linear guide axis.

The distance measuring unit is intended to measure a distance to an object to be photographed by the first/second camera module units (110, 111), and the controller is intended to move the first/second camera module units (110, 111) by driving the driving unit (120) based on the distance to the object measured by the distance measuring unit (140).

At this time, according to an exemplary embodiment of the present invention, the distance measuring unit (140) may use an AF (auto focusing) algorithm. The present invention is not limited thereto. For example, any mechanism capable of measuring a distance between the first/second camera module units (110, 111) and an object may be applicable to the present invention.

Furthermore, according to an exemplary embodiment of the present invention, the driving unit (120) may be a step motor or a BLDC motor. The driving unit (120) is not limited thereto. For example, any driving means capable of rotating the guide axis (130) may be employed. The controller (150) serves to control the driving unit (120) based on a distance to an object measured by the distance measuring unit (140).

The distance adaptive 3D camera according to an exemplary embodiment of the present invention enable to realize a 3D image of an 3D image area (200) in which an image photographed by the first camera module unit (110), and an image photographed by the second camera module unit (111), as illustrated in FIG. 4. However, in a case the object to be photographed is too near to the first/second camera module units (110, 111) as shown in FIG. 4, the 3D image area (200) is too narrow, making the area defocused, or the object may be doubly viewed, whereby it is difficult to realize the 3D image.

Therefore, the distance adaptive 3D camera according to the exemplary embodiment of the present invention moves the first/second camera module units (110, 111) to a direction in which the first/second camera module units (110, 111) near each other, to thereby expand the 3D image area (200), in a case a near object is to be photographed. As a result, it is possible to realize a normal 3D image just like photographing an object in the distance.

Mode for the Invention

FIG. 6 is a 3D image combination flowchart of a distance adaptive 3D camera according to an exemplary embodiment of the present invention, in which an exemplary embodiment is shown that uses the distance measuring unit (140) employing an AF algorithm.

In a case a camera power is turned on, the first/second camera module units (110, 111) move to a farthest distance from each other, and the distance measuring unit (140) analyzes a distance to an object by analyzing an image frame, employing an AF algorithm. In a case there is no change in the distance to the object, a 3D image can be composed. However, in a case there is a change in the distance to the object, that is, in a case a distance between the first/second camera module units (110, 111) is inadequate for photographing an image, the controller (150) drives the driving unit (120) to move the first/second camera module units (110, 111) to a position adequate for photographing an image, whereby a 3D image can be composed.

Furthermore, according to another exemplary embodiment of the present invention, the distance measuring unit (140) may measure a distance between the first/second camera module units (110, 111) and an object, using an infrared distance measuring method. At this point, a distance value between the first/second camera module units (110, 111) based on the distance to the object is pre-stored as data value, where the controller (150) may compare the measured distance to the object and the pre-stored data value to control a distance between the first/second camera module units (110, 111).

Meanwhile, in a distance adaptive 3D camera according to another exemplary embodiment of the present invention, the controller (150) may control movement of the first/second camera module units (110, 111) based on a ratio of an area in which the first/second images each photographed by the first/second camera module units are overlapped. That is, based on the pre-stored value, for example, if a ratio of the 3D image area (200) is greater than 95% of an image photographed by the first/second camera module units (110, 111), the controller (150) may consider the area as a normal photographing area. Alternatively, if a ratio of the 3D image area (200) is less than 95% of an image photographed by the first/second camera module units (110, 111), the controller (150) may move the first/second camera module units (110, 111) to come close to each other, to make the ratio of the 3D image area (200) greater than 95% of an image.

INDUSTRIAL APPLICABILITY

The present invention has an industrial applicability in that 3D image photographing scopes for long distance as well as short distance can be maximized by adjusting a distance between camera module units based on a distance from an object.

Although the present invention has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A distance adaptive camera comprising:
    a guide bar configured to guide camera module units having an interspace;
    a driver configured to spin the guide bar on its axis;
    a first camera module unit to photograph a first image;
    a second camera module unit to photograph a second image, where the interspace is adjusted by a spinning of the guide bar and the movement of the camera module units along the guide bar;
    a distance measurer configured to measure a distance between the camera module units and an object; and
    a controller configured to control the spinning of the guide bar by operating the driver according to the change of the distance between the camera module units and an object during operation of the camera module units,
    wherein the first camera module unit and the second camera module unit simultaneously move on the guide bar to distance or near therebetween according to the spinning of the guide bar, and
    wherein the controller is configured to control movement of the first camera module unit and the second camera module unit based on a ratio of an area in which the first image photographed by the first camera module unit and the second image photographed by the second camera unit are overlapped, and
    wherein, when a ratio of the overlapped area is less than 95% of an image photographed by the first camera module unit and the second camera module unit, the controller is configured to move the first camera module unit and the second camera module unit to come close to each other.

2. The camera of claim 1, wherein the distance measurer includes a first memory storing a distance measuring algorithm, the distance measure being configured to measuring the distance between the first camera module unit and the object and the distance between the second camera module unit and the object by using the stored distance measuring algorithm, and
    wherein the distance measuring algorithm is an AF (Auto Focusing) algorithm or an infrared distance measuring algorithm.

3. The camera of claim 1, wherein the driver is a step motor or a BLDC motor.

4. A distance adaptive camera comprising:
    a first camera module unit configured to photograph a first image;
    a second camera module unit horizontally distanced from the first camera module unit at a predetermined interspace, configured to photograph a second image; and
    an adjuster configured to adjust the interspace, wherein the interspace is adjusted according to a change of a distance between the camera module units and an object during operation of the camera module units; and a controller configured to control the adjuster, wherein the first camera module unit and the second camera module unit simultaneously move on a guide bar to distance or near therebetween according to the adjusted interspace, wherein the controller controls the adjuster to adjust the interspace by moving the first camera module unit and the second camera module unit based on a ratio of an area in which the first image photographed by the first camera module unit and the second image photographed by the second camera unit are overlapped, and wherein, when a ratio of the overlapped area is less than 95% of an image photographed by the first camera module unit and the second camera module unit, the controller is configured to control the adjuster to cause the first camera module unit and the second camera module unit to come close to each other.

5. The camera of claim 4, wherein the adjuster adjusts the interspace to move the first camera module unit or the second camera module unit to a position suitable for photographing an image, if the interspace is inadequate for photographing the image.

6. The camera of claim 4, wherein the adjuster includes a driver configured to spin the guide bar.

7. The camera of claim 6, wherein the first and second camera module units move along the guide bar to distance or near there between responsive to spinning directions of the guide bar.

8. The camera of claim 6, further comprising a distance measurer including a first memory storing a distance measuring algorithm and measuring a distance between the first camera module unit and an object and a distance between the second camera module unit and the object by using the stored distance measuring algorithm.

9. The camera of claim 8, wherein the controller includes a second memory storing an information and controls movement of the first and second camera module units by controlling the driver based on a result of comparison of the information and the distance measured by the distance measuring unit, and wherein the information is a pre-determined distance value between the first and second camera module units based on the distance between the first camera module unit and an object and the distance between the second camera module unit and the object.

10. The camera of claim 8, further wherein the distance measuring algorithm is an AF (Auto Focusing) algorithm or an infrared distance measuring algorithm.

11. The camera of claim 6, wherein the driver is a step motor or a BLDC motor.

12. The camera of claim 1, wherein the guide bar is a linear guide bar.

13. The camera of claim 6, wherein the guide bar is a linear guide bar moving in axial direction by spinning its body, using a spiral on a surface of the body.

14. The camera of claim 6, wherein the controller is configured to control the driver by comparing a pre-stored interspace value between the first camera module unit and the second camera module unit, and an actual distance value between the camera module units and the object.

* * * * *